Nov. 4, 1924.

A. MESSER

FLUID PRESSURE REGULATING VALVE

Filed Feb. 2, 1923

1,514,217

Inventor:
Adolf Messer
By: Wm O. Bell
Atty.

Patented Nov. 4, 1924.

1,514,217

UNITED STATES PATENT OFFICE.

ADOLF MESSER, OF FRANKFORT-ON-THE-MAIN, GERMANY.

FLUID-PRESSURE-REGULATING VALVE.

Application filed February 2, 1923. Serial No. 616,463.

*To all whom it may concern:*

Be it known that I, ADOLF MESSER, a citizen of the Republic of Germany, residing at Frankfort-on-the-Main, Germany, have invented certain new and useful Improvements in Fluid-Pressure-Regulating Valves, of which the following is a specification.

This invention relates to improvements in fluid pressure regulating valves which are used for many purposes including the regulation and delivery of gases to oxy-acetylene welding and cutting apparatus at desired reduction in pressure.

Pressure regulating valves are employed very largely for reducing a high pressure of gas in a storage tank to a low pressure for different purposes and in their construction it has been customary to employ a relatively movable nozzle and disk, the latter being made of hard rubber or other suitable substance and forming a seat to close the nozzle. Under some conditions of use the nozzle of the regulating valve is opened and closed frequently and high tension means are necessary to overcome the high pressure of the gas supply.

It has been found in practice that the valve disk or seat sometimes takes fire and not only results in destruction of the disk or seat but in more or less damage to the other parts of the regulating valve. Where the gas is oxygen under high pressure, combustion is supported thereby to such an extent that in some cases the nozzle and other parts of the regulating valve have been partly melted, the diaphragm has been destroyed and flame has issued through the openings in the bonnet. My theory is that combustion of the disk or seat is caused by the intense heat which is produced when the disk or seat is closed against the nozzle thereby causing high pressure of the gas supply to pile up or accumulate in the nozzle passage against the disk or seat; and when combustion starts it is promoted by the oxygen to such an extent that some times the regulating valve is materially damaged. If the disk or seat is slightly roughened by wear or otherwise combustion seems to take place more readily than when the seat or disk is new and in first class condition. I have found that combustion will occur with disks or seats made of hard rubber and also of other materials generally employed.

The object of this invention is to protect the valve disk or seat of a fluid pressure regulating valve from combustion by reason of heat generated by the gas pressure therein, and to this end it consists broadly in preventing the production or accumulation of such heat at the disk or seat as will tend to create combustion.

For the purposes of this application I have illustrated the invention in an approved type of high pressure regulating valve and referring to the drawings—

Figure 1:
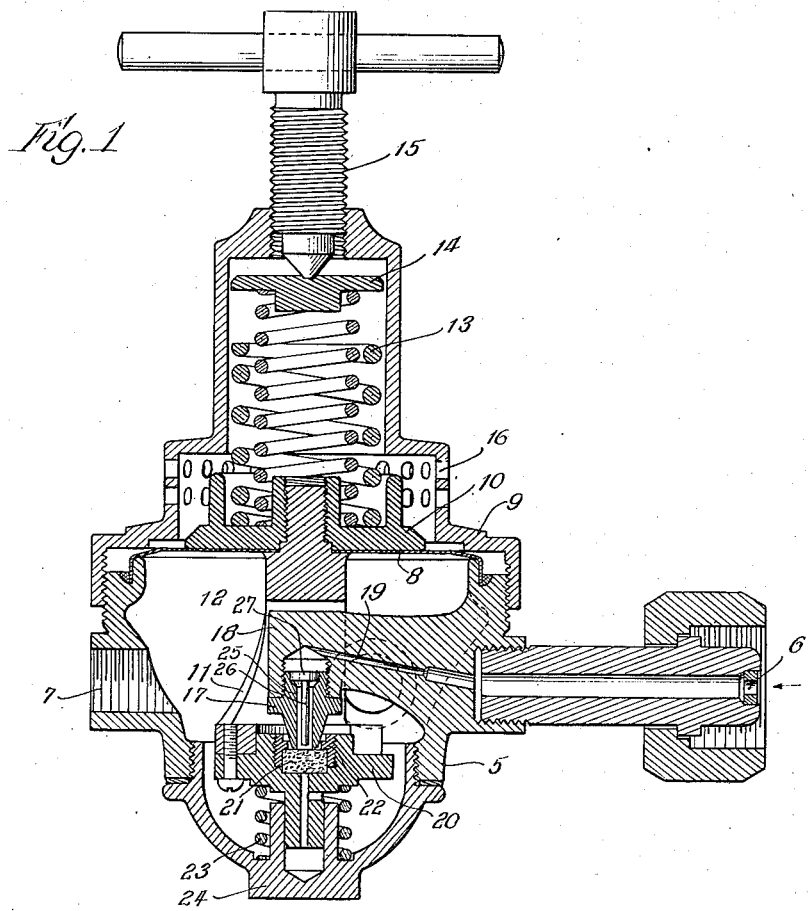
Fig. 1 is a vertical sectional view.
Figure 3:
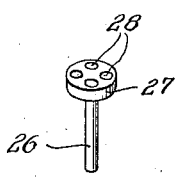
Fig. 3 is a perspective view of the device which is located in the nozzle.
Figure 2:
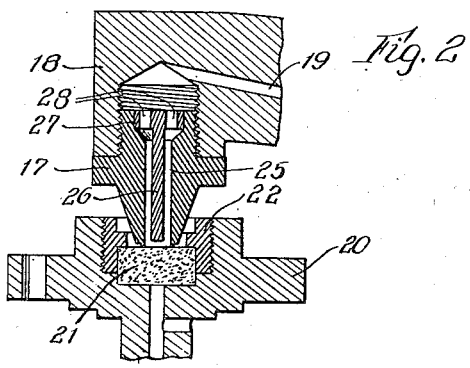
Fig. 2 is an enlarged sectional view showing the parts with which my invention is immediately embodied.

Referring to the drawings, the valve casing comprises a body 5 provided with a gas inlet 6 adapted to be connected with the gas supply tank, and an outlet 7 through which the gas is delivered to the work. Pressure gauges are customarily connected to the inlet and the outlet of the regulating valve or to the gas connections thereto. A diaphragm 8 is arranged between the body 5 and the bonnet 9 of the valve casing and is secured in place by the collar 10 which threadedly engages the stem of a yoke 11 within the diaphragm chamber 12. One or more springs 13 is arranged within the bonnet between the collar 10 and a button 14, and an adjusting screw 15 threaded in the end of the bonnet engages the button to vary the tension of the spring. The bonnet is preferably provided with openings 16 to permit instant escape of pressure without damage to the regulating valve in the event the diaphragm is broken. An inlet nozzle 17 is secured in a bridge 18 and is connected by a passage 19 with the gas inlet 6. The yoke 11 straddles the bridge and nozzle and carries a support 20 having a valve disk 21 seated therein and secured by a valve ring 22. The valve disk is arranged to engage the discharge end of the nozzle for shutting off the passage of gas from the supply through the nozzle to the chamber 12 and thence through the outlet 7 to the work. A balance spring 23 is interposed between the support 20 and a cap 24 on the valve body 5 and tends to hold the valve disk 21 against the discharge end of the nozzle.

Thus far I have described a type of high pressure regulating valve with which my present invention may be easily embodied with most satisfactory results and it will be understood that I have selected this type of regulating valve for the purpose of illustrating my invention and because it is a successful commercial type, but I do not wish to be understood as restricting the invention to this or any other special type or construction of regulating valve.

In this type of regulating valve the valve disk is moved to and from the discharge end of the nozzle and forms a seat for closing the nozzle as required. When the disk is seated against the discharge end of the nozzle to shut off the flow of gas through the nozzle high pressure accumulates in the passage 25 and at the discharge end of the nozzle. The reduction in pressure by the regulating valve may be from a couple of thousand pounds to a very few pounds and the wall of the nozzle and the discharge end thereof will be cooled while the gas is flowing but my theory is that when the disk is seated against the end of the nozzle the pressure piles up so quickly upon the disk that what I may describe as the longitudinal center of the column of gas in the passage 25 of the nozzle provides such intense heat that the disk becomes ignited, and this more often takes place when the disk is worn or otherwise roughened in service. The result is that combustion of the disk takes place which is highly promoted by the gas and the regulating valve becomes seriously damaged if not practically destroyed before the supply of gas can be shut off.

My invention avoids this by providing means to prevent the production of heat from the gas at the discharge end of the nozzle and this I have satisfactorily accomplished in one way by introducing a stem 26 in the passage 25 of the nozzle. This stem is supported by a plug 27 which is provided with openings 28 and is mounted in the nozzle so that the openings 28 connect with the passage 25 of the nozzle. To maintain a desired volume in the flow of gas through the nozzle it will be desirable to enlarge the passage 25 to compensate for the stem 26, and the aggregate area of the openings 28 will be proportioned to the effective area of the passage 25.

The general purpose of using the stem 26 is to prevent the production of such heat at the discharge end of the nozzle as will produce combustion of the disk 21. The stem 26 may provide a medium for carrying the heat away from the disk and back to the end of the nozzle passage to the discharge end; or it may be that the stem functions to distribute the accumulated gas in the nozzle passage against the wall of the passage and thereby prevents the formation of the hot center or core in this column of gas as has been customary heretofore. Whichever is the scientific correct theory, or whether both are correct and conjointly describe the result, I do know that when the stem is used in the nozzle combustion of the disk does not take place. I have demonstrated this for my own benefit and in a commerical way, and in the particular type of valve illustrated in the drawings I have found that where the nozzle is provided with the stem combustion does not take place but if a nozzle without the stem is substituted or if the stem and its plug are removed from the nozzle combustion is liable to take place on the next operation of the valve.

The stem forms a core filling the passage in the nozzle centrally and making of it an annular passage. I have also demonstrated my invention in other types of fluid pressure regulating valves with the same satisfactory results and I believe it can be successfully used wherever the same or substantially similar conditions prevails, including valves wherein the nozzle moves relatively to the disk or seat as well as in valves wherein the disk or seat moves relatively to the nozzle.

The practical benefit and advantage of my invention are very important since the intense heat of combustion which is promoted by the gas will very soon damage a regulating valve to the point of destruction and will very quickly damage the nozzle and the disk and the disk ring and its support to a point which renders the valve inoperative. Unless the gas is promptly shut off the heat may break the diaphragm and permit the flame to escape through the bonnet openings 16 and start a fire; and combustion of the disk with resulting flame has been known to take place while the outlet 7 was not connected with a torch so that the flame issued directly from the outlet 7 and might have seriously injured the operator or started a fire.

I have shown my invention in a very simple embodiment which adapts it for this particular type of valve; I do not restrict the invention to this embodiment although I have found it entirely satisfactory; and I wish it to be understood that I reserve the right to change the form, construction and arrangement of the invention and embody it otherwise than herein disclosed as may be necessary or desirable to adapt it for other types of valves or for other reasons so long as the same come within the scope of the following claims:—

I claim:

1. A fluid pressure regulating valve comprising a nozzle and a combustible valve disk or seat therefor, one of said parts being movable relatively to the other part, and a stem arranged within the nozzle and extending to or about the discharge end thereof to prevent the creation by the fluid pressure within the nozzle of such heat as will cause combustion of the disk or seat.

2. A fluid pressure regulating valve comprising a nozzle and a combustible valve disk or seat therefor, one of said parts being movable relatively to the other part, and a stem arranged within the nozzle and engaged with the nozzle at its rear end and extending to or about its discharge end to prevent the creation by the fluid pressure within the nozzle of such heat as will cause combustion of the disk or seat.

3. A fluid pressure regulating valve comprising a nozzle and a valve disk or seat therefor, one of said parts being movable relatively to the other part, means for preventing the creation by the fluid pressure within the nozzle of sufficient heat to cause combustion of the disk or seat which consists of a plug supported at the rear end of the nozzle and having openings therein communicating with the passage in the nozzle, and a stem supported by said plug and projecting freely within the nozzle passage to or about the discharge end thereof.

4. A fluid pressure regulating valve comprising a nozzle having an annular passage therein, and a combustible valve disk or seat to engage the discharge end of said nozzle, one of said parts being movable relatively to the other part.

5. A fluid pressure regulating valve comprising a nozzle having a metal core therein forming an annular passage, and a combustible valve disk or seat arranged to engage the discharge end of said nozzle, one of said parts being movable relatively to the other part.

6. A fluid pressure regulating valve comprising a nozzle, a metal core arranged within the nozzle and providing an annular passage therein, a plug supporting said core within the passage and engaged with the nozzle at a point removed from its discharge end, and a combustible valve seat or disk arranged at the discharge end of the nozzle, the nozzle and the valve seat or disk being relatively movable.

ADOLF MESSER.